United States Patent
Stahel et al.

(10) Patent No.: US 7,114,774 B2
(45) Date of Patent: Oct. 3, 2006

(54) MOTORCYCLE PASSENGER ARMREST

(75) Inventors: Alwin J. Stahel, St. Paul, MN (US);
Brian K. Stahel, New Brighton, MN (US)

(73) Assignee: Kuryakyn Holdings, Inc., Somerset, WI (US)

( * ) Notice: Subject to any disclaimer, the term of this patent is extended or adjusted under 35 U.S.C. 154(b) by 0 days.

(21) Appl. No.: 10/990,086

(22) Filed: Nov. 16, 2004

(65) Prior Publication Data

US 2006/0119145 A1 Jun. 8, 2006

(51) Int. Cl.
*A47C 7/62* (2006.01)

(52) U.S. Cl. .............................. 297/188.15; 297/411.29
(58) Field of Classification Search ........... 297/188.14, 297/188.15, 188.16, 411.29, 411.3, 411.31, 297/411.38, 188.18
See application file for complete search history.

(56) References Cited

U.S. PATENT DOCUMENTS

| 4,695,096 | A |   | 9/1987  | Kincaid ...................... 297/417 |
|-----------|---|---|---------|----------------------------------------|
| 5,195,711 | A | * | 3/1993  | Miller et al. ............ 297/188.16   |
| 5,259,579 | A | * | 11/1993 | Schneider .......... 297/188.16 X       |
| 6,176,405 | B1|   | 1/2001  | Roach ........................ 224/414   |
| 6,520,576 | B1| * | 2/2003  | Burns et al. ........ 297/188.14 X      |

* cited by examiner

*Primary Examiner*—Anthony D. Barfield
(74) *Attorney, Agent, or Firm*—Dicke Billig & Czaja, PLLC

(57) ABSTRACT

A passenger armrest for a motorcycle is mounted on a pivoting strut that has an armrest pad on an outer end, and which moves from a position adjacent a side of a motorcycle passenger seat, to a position wherein it is remote from the passenger seat and is open so that a passenger can mount and dismount the passenger seat. A beverage container holder is mounted on the armrest pad, and can used for supporting a beverage container when it extends forwardly from the armrest pad and then folded and pivoted so it is underneath the armrest pad.

8 Claims, 4 Drawing Sheets

MOTORCYCLE PASSENGER ARMREST

BACKGROUND OF THE INVENTION

A motorcycle passenger armrest is supported on a bracket for pivoting about an upright axis from a position on the side of a passenger on a motorcycle seat to a second open position wherein it swings away from the seat and extends generally perpendicular to a longitudinal axis of the motorcycle so a passenger can mount and dismount the passenger seat. The armrest includes a beverage holder that is movable from a stored position underneath the armrest pad to a usable position wherein it will support a beverage container.

Passenger armrests are used on motorcycles in many instances, and a folding or pivoting passenger armrest is illustrated in U.S. Pat. No. 4,695,096. The armrest in Patent '096 has a substantial offset bracket, and while it swings out of the way, it is not provided with a type of folding beverage holder.

Also, a beverage and food container for motorcycles is shown in U.S. Pat. No. 6,176,405. In Patent '405, a support is secured to the tank of the motorcycle forwardly of the operator, and a container is releasably attached to the support. When the container is removed from the motorcycle tank, it will fold for storage.

SUMMARY OF THE INVENTION

The present invention relates to a passenger armrest for a motorcycle passenger seat, which will move from a usable position alongside of the seat to a position where it is pivoted outwardly from its usable position, to permit mounting and dismounting the passenger seat.

The armrest is supported on the motorcycle frame with an attractive single arm support that is used for the armrest pad. A beverage container holder is provided on the armrest pad support. The beverage container holder is movable from a position where it extends forwardly from the armrest pad to support a beverage container, and it is foldable so that it will pivot to a position underneath the armrest pad support, out of the way.

DETAILED DESCRIPTION OF THE PREFERRED EMBODIMENTS

Figure 1:
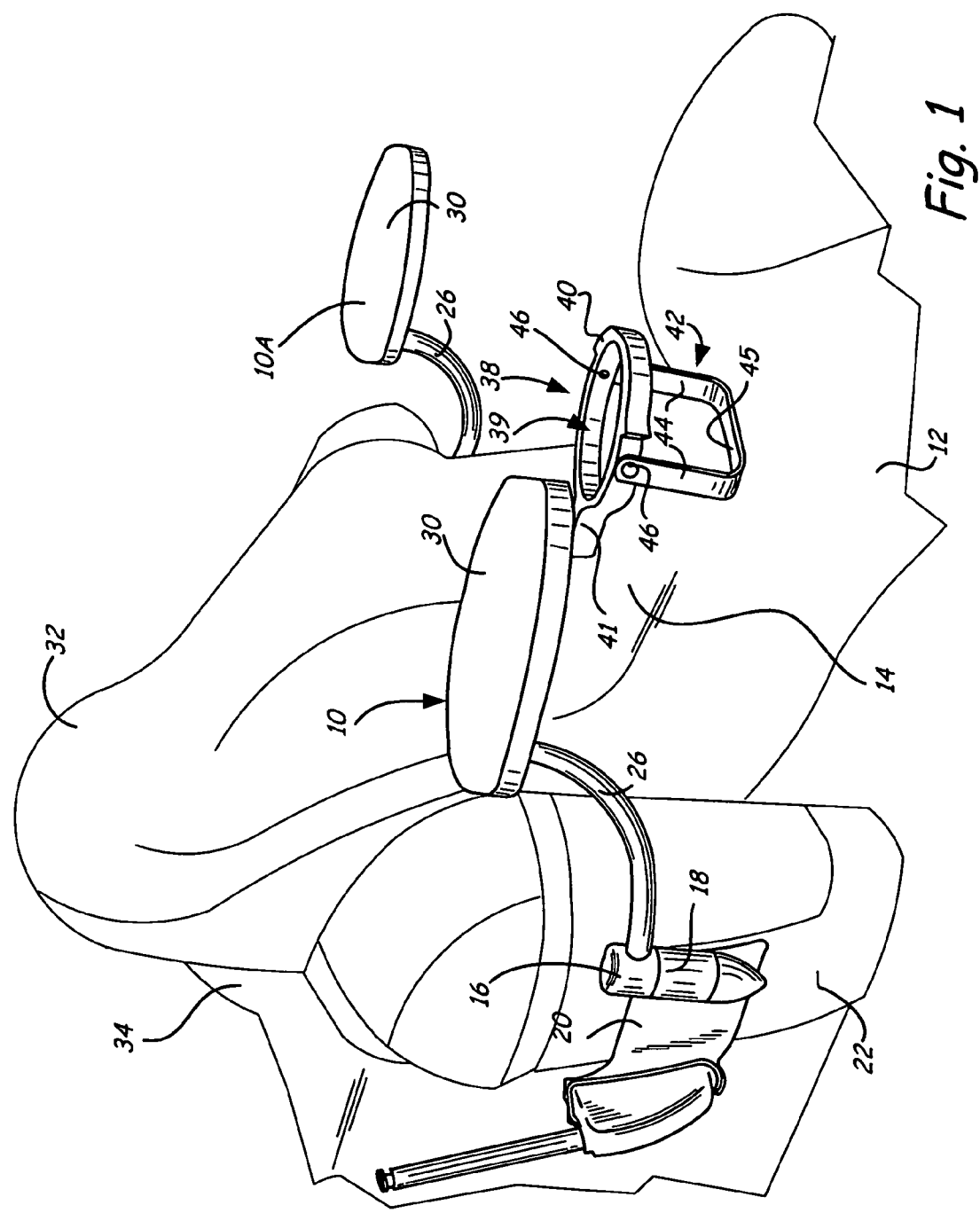
FIG. 1 is a perspective view of a passenger armrest made according to the present invention with a beverage holder folded to a stored position.

A passenger's armrest indicated generally at 10 is installed on a motorcycle 12, represented fragmentarily, and is positioned alongside of a passenger seat 14 of the motorcycle. As shown, two of the armrests 10 can be provided, one on each side of the passenger's seat. The right-hand armrest will be shown in detail. The left-hand armrest 10A does not necessarily have a beverage container that is illustrated on the right-hand armrest, but can have one if desired.

The passenger's armrest 10 has a pivot pin 16 at a rear end that pivotally mounts in a sleeve or hub 18 that is secured to the motorcycle frame with a mounting panel or bracket 20. The bracket 20 is bolted onto a fixed portion of the motorcycle, as shown, to a side wall of a trunk 22 that is supported on the motorcycle frame. The bracket 20 is supported so the arm rest is above the level of the passenger seat 14. The pivot pin 16 is an internal stop for stopping pivoting with the passenger armrest 10 in its usable position, and also for stopping the armrest 10 in its open or passenger access position as shown in FIG. 3.

The pivot pin 16 supports a curved support strut 26 that is fixed to the pivot pin 16 and which extends upwardly and forwardly. An armrest pad support plate 28 is fixed to the strut 26, with suitable screws or other fasteners, as can be seen in FIG. 4, and the armrest pad support plate 28 supports an armrest pad 30 that is of suitable size and shape for providing a comfortable rest for the arm of a passenger on the motorcycle.

The armrest pad 30, as shown, is positioned laterally alongside the passenger seat 14, and is at suitable height so the passenger can rest an arm on the pad.

Figure 3:
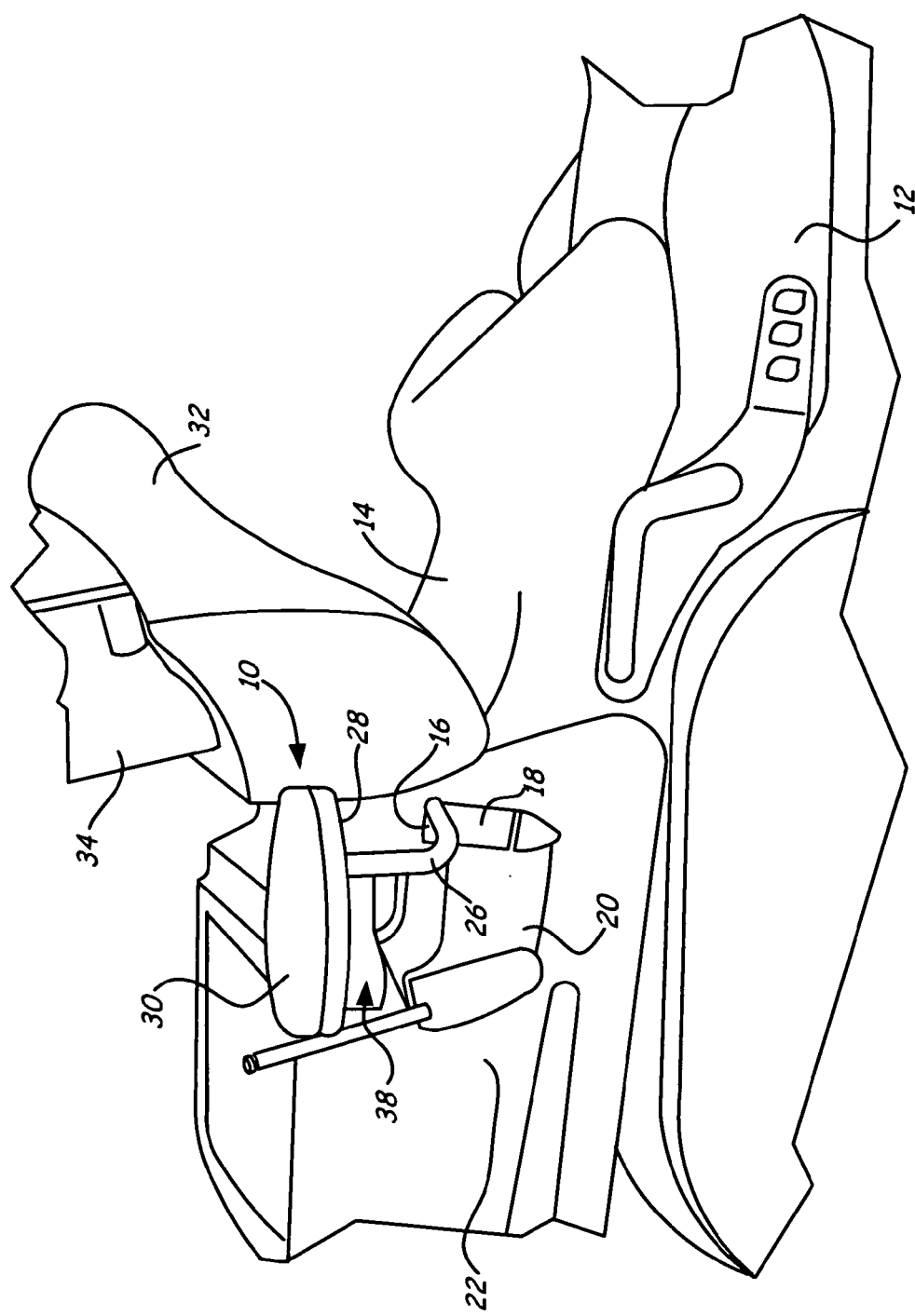
FIG. 3 is a side perspective view of the passenger armrest in a position pivoted outwardly to permit mounting and dismounting from the passenger seat, and showing a trunk cover carrying the backrest of the passenger seat in a raised position to illustrate the clearance provided by the pivoting of the passenger armrest.

The pivoting of the armrest, including the support strut and the pad 30 to its open position is shown in FIG. 3, where the armrest pad 30 extends laterally out from the side of the motorcycle. It is also shown in FIG. 3 that in this open position the armrest is our of the way so the passenger backrest 32 can be pivoted forwardly and the motorcycle trunk lid 34 can be opened.

Figure 2:
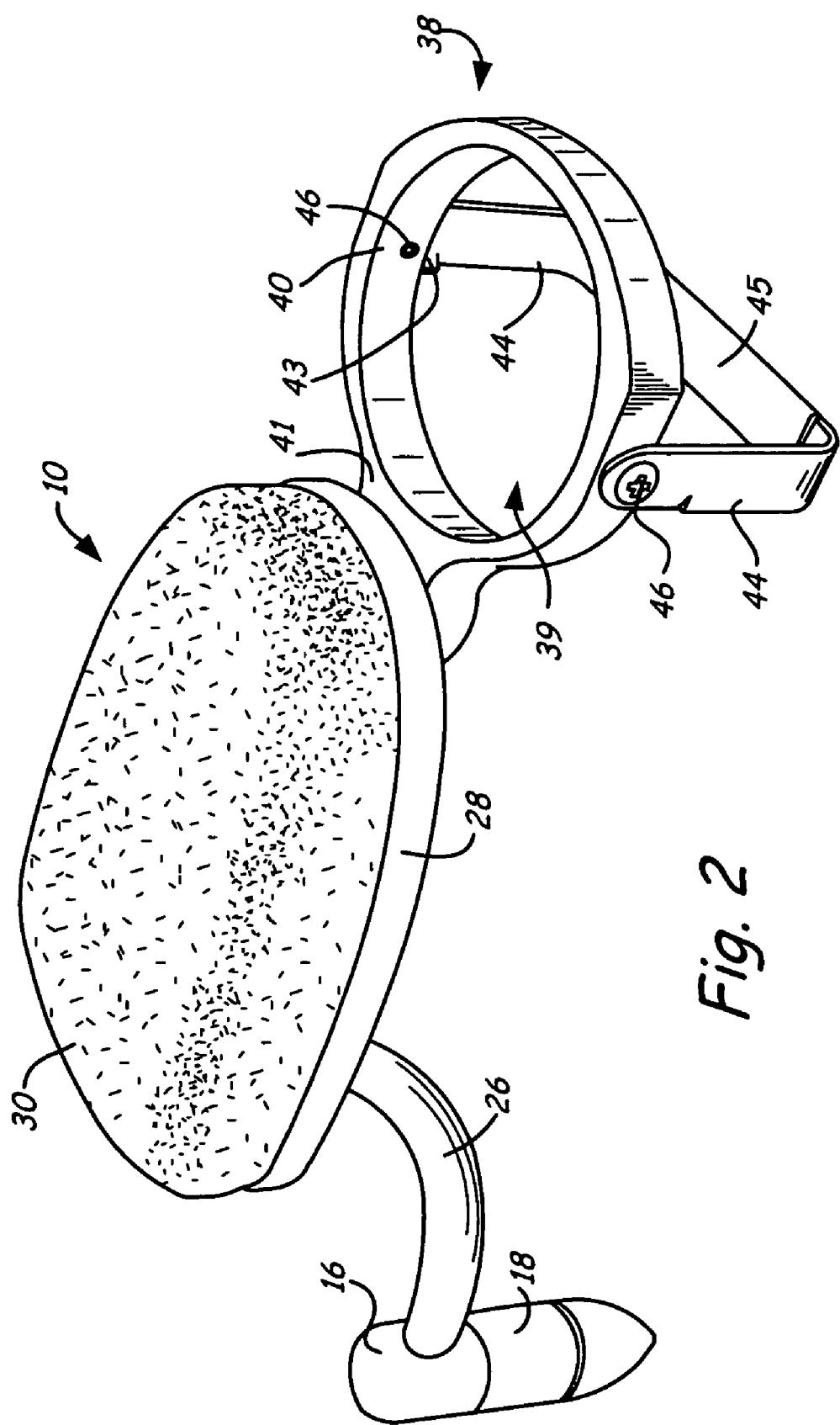
FIG. 2 is a view similar to FIG. 1, with the armrest pad and pad support enlarged, and showing a beverage container holder in its usable position.
Figure 4:
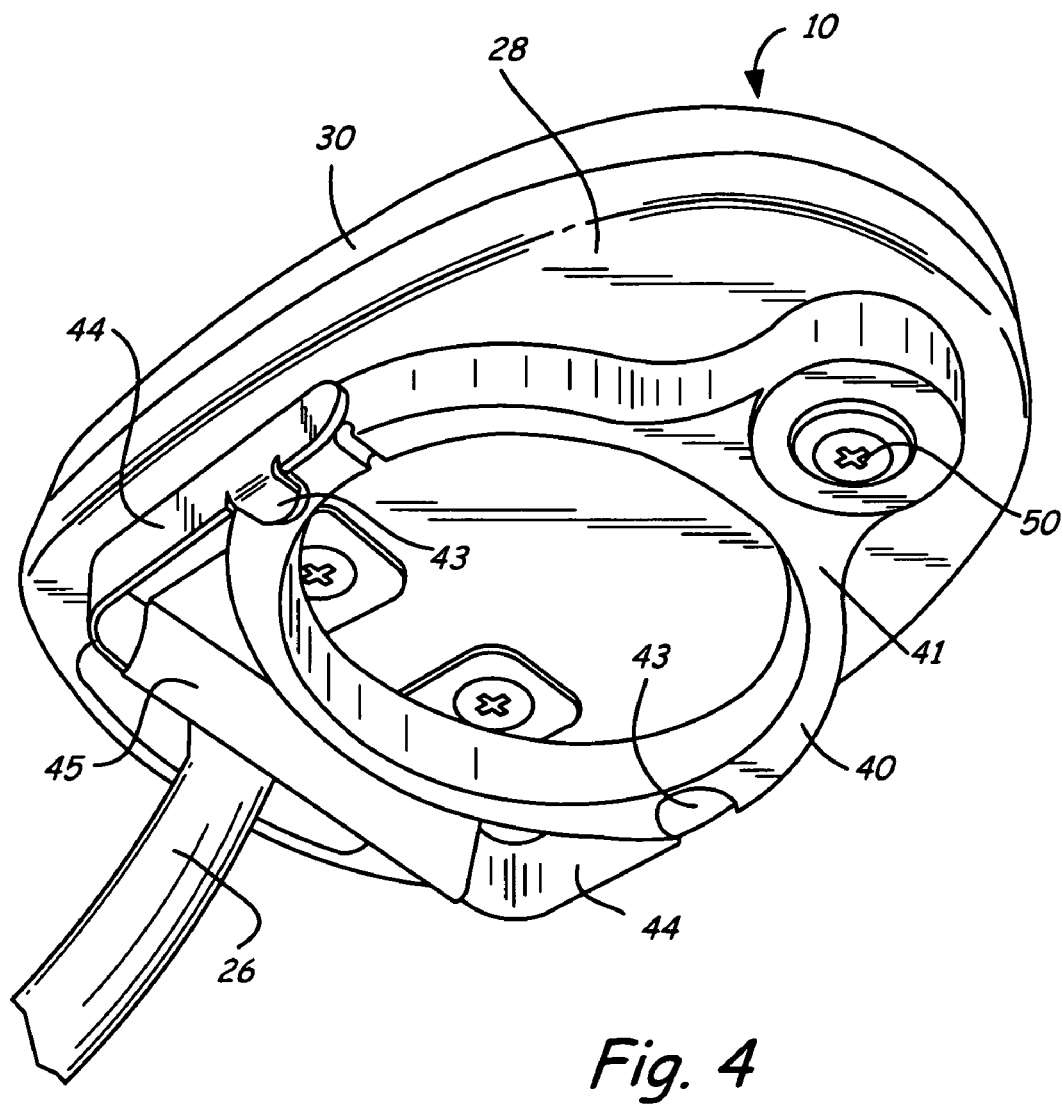
FIG. 4 is a bottom perspective view showing the beverage container holder in its stored position underneath the armrest pad support.

The armrest pad support plate 28 is used for mounting a folding beverage container or can holder assembly 38 shown in detail in FIGS. 2 and 4. The beverage holder assembly 38 includes a container ring 40 that has a center opening 39 that is of size to hold an insulated cover for a beverage container or can. The ring 40 has a stirrup or bottom beverage container support 42 that is shaped like a "U", and has side straps 44 that are pivotally mounted with pins 46 on a common axis. The side straps as spaced so a cross member 45 is about the same length as the diameter of the opening 39 to support a beverage container.

The stirrup 42 will pivot from its usable, depending position shown in FIGS. 1 and 2 forwardly to be substantially on the same plane as the ring 40, as can be seen in FIG. 4. The side straps 44 have stop tabs 43 that stop the stirrup in its storage position. The ring 40 has an ear 41 that is underneath the armrest pad support plate 28, and the ear 41 and thus the ring 40, are pivotally mounted to the armrest pad support plate 28 with a pivot pin or screw 50. The pivot pin or screw 50 can be adjustable drag, or a brake can be provided so that there would be some drag or load on the pivoting of the beverage container holder 38. With the stirrup 42 folded to be in substantially the same plane as and parallel to the ring 40, it can be seen that the beverage holder assembly 38 can be pivoted rearwardly so that it underlies the armrest support pad 28 and is completely out of the way. The stored ring 40 extends downwardly a short distance from the support plate 28 as shown in FIG. 1. The beverage container holder is very unobtrusive when it is in the folded and stored position.

Of course, various types of arm pads can be utilized, and the arm pivot arrangement can be made as desired with various position stops or detents, such as a spring loaded ball that fits into an indent on the pivot pin, and other types of detents.

Likewise, the beverage container holder can be made in different annular configurations. The support for the beverage container comprising the folding, U-shaped stirrup 42 as shown, is capable of being folded to a position generally parallel to the beverage container holder ring 40.

The beverage container holder also can be called a drink cup holder.

Although the present invention has been described with reference to preferred embodiments, workers skilled in the art will recognize that changes may be made in form and detail without departing from the spirit and scope of the invention.

What is claimed is:

1. A combined motorcycle armrest and folding beverage container holder mounted on the armrest, the armrest having an arm pad thereon, the beverage container holder comprising a ring having a center opening of size to accommodate a beverage container, a pivot mounting the ring onto the armrest below the arm pad about a generally upright ring pivot axis, and a beverage container support stirrup pivotally mounted on said ring, said stirrup having a bottom strap for supporting a beverage container within the ring in a usable position, and having side straps pivoted onto opposite sides of the ring about an axis generally perpendicular to the upright axis, the side straps being of length so that the stirrup can be pivoted relative to the ring to a folded position to be on a plane parallel to a plane of the ring, the ring and stirrup being pivotable about the upright ring pivotal axis from a position wherein the center opening is clear of the armrest and the stirrup is in its usable position to a stored position with the ring and stirrup below the arm pad.

2. The combination of claim 1, wherein the armrest has a pivot member spaced from the arm pad for mounting onto a motorcycle about a second upright pivot axis parallel to the ring pivot axis, and the armrest being movable about the second upright axis to move the arm pad from a first position adjacent a seat of the motorcycle to a second position laterally remote from the seat.

3. The combination of claim 2, wherein the ring extends forwardly from the arm pad when in its usable position and with the armrest in its first position.

4. An armrest for a passenger seat on a motorcycle comprising a support strut, a pivot pin for mounting said support strut to a bracket on the motorcycle along a side of the passenger seat about a generally upright axis, an armrest pad supported on an outer end of said support strut and providing a surface for supporting an arm, said support strut and armrest being pivotally mounted for movement about the generally upright axis from adjacent a side of a passenger seat on a motorcycle, to a position extending laterally outwardly from the passenger seat of a motorcycle, and a beverage container holder pivotally supported on an underside of said armrest pad for holding a beverage container, the container holder being pivotable from a position extending outwardly from the armrest pad to a position underneath the armrest pad.

5. The armrest of claim 4, wherein said beverage container holder comprises a ring having an opening of size to receive a beverage container, a beverage container support supported from said ring for supporting an end of a beverage container holder within the opening of the ring, and a pivotal mounting for mounting said ring to an underside of said armrest pad for pivotal movement about a generally upright axis between a position extending forwardly of said armrest pad to the position wherein the beverage container holder is underneath the armrest pad.

6. The armrest of claim 5, wherein said beverage container support is pivotally movable from a position depending from the ring to a position substantially parallel to and nesting with the ring, the ring and beverage container support being pivotable as a unit to the position underneath the armrest pad.

7. An armrest for a passenger seat on a motorcycle comprising a support strut, a pivot for mounting said support strut to the motorcycle along a side of the passenger seat about an upright axis, an armrest supported on an outer end of said support strut and providing a generally horizontal surface for supporting an arm, and a beverage container holder supported on and below said armrest for holding a beverage container, the beverage container holder comprising a ring having an opening of size to receive the beverage container, a support depending from said ring for supporting an end of the beverage container in the opening of the ring, the ring being pivotally mounted to an underside of said armrest for pivotal movement between a position extending forwardly of said armrest to a position underneath the armrest.

8. The armrest of claim 7, wherein said support on the beverage container holder comprises a pair of side straps pivotally mounted to opposite sides of the ring about an axis extending laterally of the upright axis, the straps being pivotally movable from a position depending from the ring to a position substantially parallel with the ring, and within a periphery of the armrest when the ring is pivoted to the position underneath the armrest.

\* \* \* \* \*

UNITED STATES PATENT AND TRADEMARK OFFICE
CERTIFICATE OF CORRECTION

PATENT NO. : 7,114,774 B2 Page 1 of 1
APPLICATION NO. : 10/990086
DATED : October 3, 2006
INVENTOR(S) : Alwin J. Stahel and Brian K. Stahel It is certified that error appears in the above-identified patent and that said Letters Patent is hereby corrected as shown below:

Title page, item [57] under Abstract, line 7 delete "can used" and insert in place thereof --can be used--.

Column 2, line 32, delete "our" and insert in place thereof --out--.

Signed and Sealed this

Sixth Day of March, 2007

JON W. DUDAS
*Director of the United States Patent and Trademark Office*